US011087444B2

(12) United States Patent
Griego

(10) Patent No.: US 11,087,444 B2
(45) Date of Patent: Aug. 10, 2021

(54) FIELD PROGRAMMABLE GATE ARRAY (FPGA) IMPLEMENTATION AND OPTIMIZATION OF AUGMENTED CONTRAST LIMITED ADAPTIVE HISTOGRAM EQUALIZATION

(71) Applicant: The Boeing Company, Chicago, IL (US)

(72) Inventor: Simon X. Griego, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 67 days.

(21) Appl. No.: 16/537,098

(22) Filed: Aug. 9, 2019

(65) Prior Publication Data

US 2021/0042895 A1 Feb. 11, 2021

(51) Int. Cl.
*G06T 5/40* (2006.01)
*G06T 1/20* (2006.01)
*G06T 5/00* (2006.01)
*G06T 5/20* (2006.01)

(52) U.S. Cl.
CPC .................. *G06T 5/40* (2013.01); *G06T 1/20* (2013.01); *G06T 5/003* (2013.01); *G06T 5/006* (2013.01); *G06T 5/007* (2013.01); *G06T 5/20* (2013.01); *G06T 2200/24* (2013.01)

(58) Field of Classification Search
CPC .. G06T 5/40; G06T 1/20; G06T 5/003; G06T 5/20; G06T 5/007; G06T 5/006; G06T 2200/24
USPC ....................................................... 382/168
See application file for complete search history.

(56) References Cited

U.S. PATENT DOCUMENTS

| 9,418,408 | B1* | 8/2016 | Thompson | G09G 5/10 |
| 2014/0257075 | A1* | 9/2014 | Kagemann, Jr. | A61B 3/102 |
| | | | | 600/399 |
| 2014/0282624 | A1* | 9/2014 | Holt | G06T 1/20 |
| | | | | 719/318 |
| 2015/0179130 | A1* | 6/2015 | Smadi | H04N 19/70 |
| | | | | 345/520 |

(Continued)

OTHER PUBLICATIONS

Zuiderveld, K., (1994). Graphics Gems IV, pp. 474-485. (Edited by Paul S. Heckbert).

(Continued)

*Primary Examiner* — Ali Bayat
(74) *Attorney, Agent, or Firm* — McDonnell Boehnen Hulbert & Berghoff LLP

(57) ABSTRACT

The present disclosure relates to imaging systems and methods relating to the processing of images. An example imaging system includes at least one camera, a display, and a processor, including a field programmable gate array (FPGA). The FPGA is configured to carry out operations. The operations include receiving at least one image among a series of image frames. The operations additionally include adjusting the at least one image to provide at least one adjusted image. Adjusting the at least one image includes partitioning the at least one image into a plurality of tile images, performing a contrast-limited histogram equalization on each tile image, and performing a bilinear interpolation for nearest neighbor tile of each tile image. The operations also include outputting the at least one adjusted image to the display.

20 Claims, 8 Drawing Sheets

(56) References Cited

U.S. PATENT DOCUMENTS

2017/0076145 A1* 3/2017 Gottemukkula ..... G06K 9/4642
2017/0301095 A1* 10/2017 Zhang ..................... G06T 7/12

OTHER PUBLICATIONS

Kokufuta, K, and Maruyama, T. (2010). 2010 International Conference on Field Programmable Logic and Applications, pp. 474-485. (IEEE Computer Society).

* cited by examiner

FIELD PROGRAMMABLE GATE ARRAY (FPGA) IMPLEMENTATION AND OPTIMIZATION OF AUGMENTED CONTRAST LIMITED ADAPTIVE HISTOGRAM EQUALIZATION

FIELD

The present disclosure relates generally to systems and methods of enhancing video images, by way of performing contrast limited adaptive histogram equalization on a field programmable gate array.

BACKGROUND

Contrast limited adaptive histogram equalization (CLAHE) is an image processing technique. Generally, this process splits an image into tiles and performs contrast limited histogram equalization on each tile. The output value for any pixel is determined by a bilinear interpolation of the contrast limited histograms of the four nearest tiles. The CLAHE process is traditionally very computationally intensive. More particularly, implementation of the CLAHE process may be too computationally intensive for a field programmable gate array.

SUMMARY

In an example, a method of implementing a contrast limited adaptive histogram equalization on a FPGA is disclosed. The method comprising receiving, at a FPGA, at least one image among a series of image frames, adjusting, by the FPGA, the at least one image to provide at least one adjusted image, wherein adjusting the at least one image, comprises partitioning, by the FPGA, the at least one image into a plurality of tile images, performing, by the FPGA, a contrast-limited histogram equalization on each tile image of the plurality of tile images, and performing, by the FPGA, a bilinear interpolation for nearest neighbor tile of each tile image of the plurality of tile images based on the contrast-limited histogram equalization, and outputting, by the FPGA, the at least one adjusted image among the series of image frames.

In another example, a computing system is described comprising a display, and a FPGA configured to transmit image data to the display, wherein the FPGA carries out operations, wherein the operations comprise receiving at least one image among a series of image frames, adjusting the at least one image to provide at least one adjusted image, wherein adjusting the at least one image, comprises, partitioning the at least one image into a plurality of tile images, performing a contrast-limited histogram equalization on each tile image of the plurality of tile images, performing a bilinear interpolation for nearest neighbor tile of each tile image of the plurality of tile images based on the contrast-limited histogram equalization, and outputting the at least one adjusted image among the series of image frames.

In another example, non-transitory computer-readable media storing instructions executable by one or more processors, wherein the instructions, when executed, cause the one or more processors to perform functions comprising, receiving, at a FPGA, at least one image among a series of image frames, adjusting, by the FPGA, the at least one image to provide at least one adjusted image, wherein adjusting the at least one image, comprises partitioning, by the FPGA, the at least one image into a plurality of tile images, performing, by the FPGA, a contrast-limited histogram equalization on each tile image of the plurality of tile images, and performing, by the FPGA, a bilinear interpolation for nearest neighbor tile of each tile image of the plurality of tile images based on the contrast-limited histogram equalization, and outputting, by the FPGA, the at least one adjusted image among the series of image frames.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

Within examples, methods and systems for implementation and optimization of augmented contrast limited adaptive histogram equalization (CLAHE) on a field programmable gate array (FPGA) are disclosed. CLAHE is a local image processing technique. Generally, CLAHE splits an image into tiles and performs contrast limited histogram equalization on each tile. The output value for any pixel is determined by a bilinear interpolation of the contrast limited histograms of the four nearest tiles (e.g., the two nearest tiles at the image edges and just the nearest tile at the image corners). Performing contrast limited histogram equalization on relatively small tile image adjusts the contrast enhancement to suit local scene statistics and using bilinear interpolation of the histograms has the effect of blending the tiles together seamlessly.

Traditional methods of CLAHE implementation are too computationally intensive for an FPGA. Systems and methods disclosed herein provide a pipeline CLAHE process to allow for implementation and optimization on an FPGA.

Figure 1:
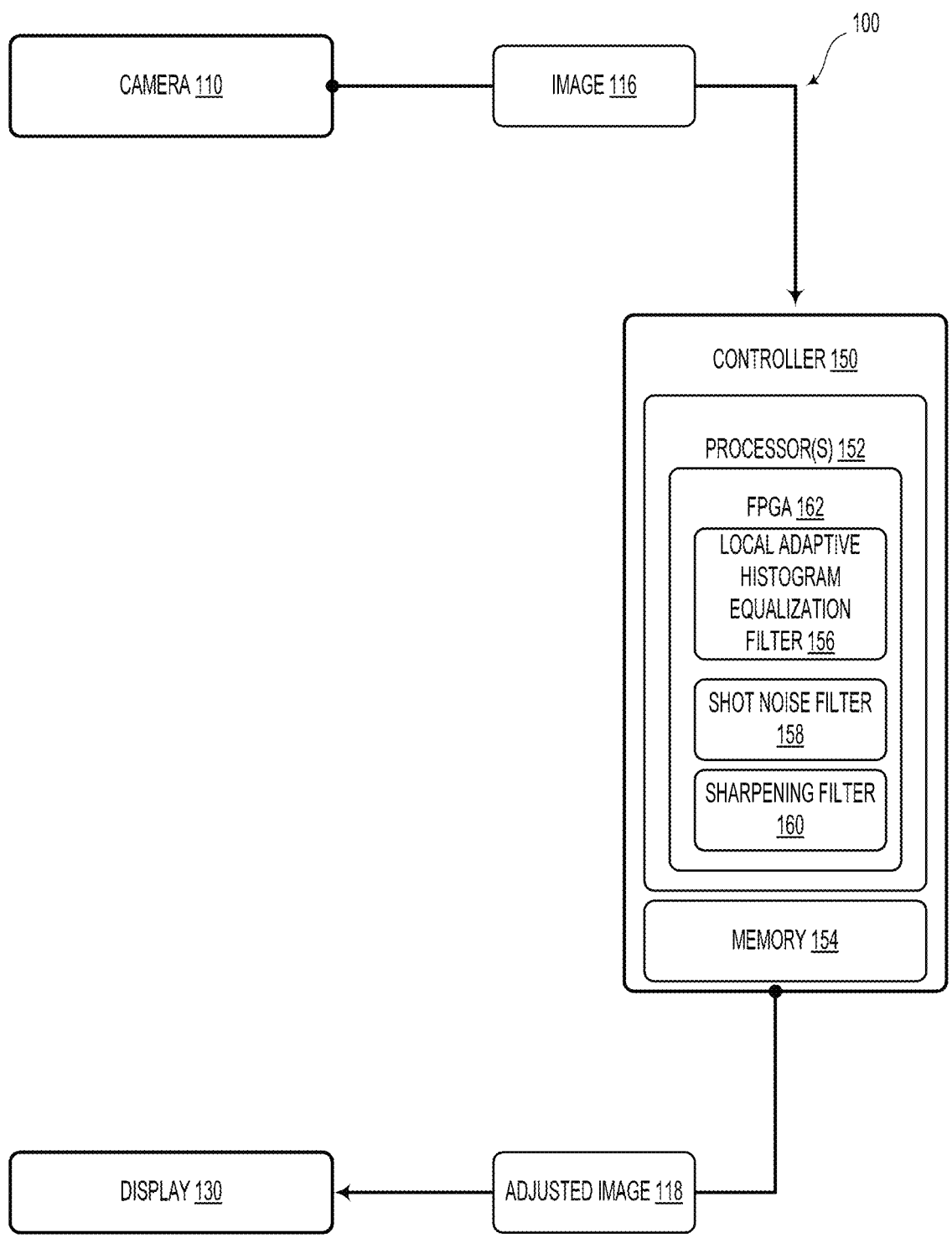
FIG. 1 is a block diagram of an example imaging processing system, according to an example implementation.

Referring now to the figures, FIG. 1 is a block diagram of an imaging processing system 100, according to an example implementation. An imaging processing system 100 is a system configured to receive an image 116 and output an adjusted image 118.

The imaging processing system 100 includes at least one camera 110. The at least one camera 110 could include multiple cameras, which could be configured to provide stereoscopic imagery.

The imaging processing system 100 further includes a display 130. The display 130 could include a video monitor or another type of display configured to provide viewable images and/or a graphical user interface.

The imaging processing system 100 additionally includes a controller 150. In some examples, the controller 150 could include at least one processor 152 and a memory 154. The at least one processor 152 includes a FPGA 162. Other types of processors, circuits, computers, or electronic devices configured to carry out software instructions are contemplated herein. In some examples, the controller 150 could be configured to communicatively interact with a graphical user interface (GUI). For example, the GUI could provide a way for a user (e.g., an aerial refueling operator (ARO)) to adjust various imaging and/or display settings (e.g., contrast filter settings, brightness settings, global gamma correction settings, adaptive histogram equalization filter settings, etc.). Any or all of the operations of the controller 150 described herein could be based, at least in part, on the interactions with the GUI. The controller 150 could also include one or more hardware data interfaces, which may provide a communicative link between the controller 150 and other elements of imaging processing system 100. In some examples, the GUI could also display notifications or other types of information to the user. For example, a display of the GUI could display adjusted images and/or other information.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

In some examples, the FPGA 162 may be configured to execute instructions stored in the memory 154 so as to carry out various operations and method steps/blocks described herein. The instructions may be stored in a permanent or transitory manner in the memory 154. As an example, the FPGA 162 could be configured to carry out operations such as those of method 300 as illustrated and described in relation to FIGS. 3-9.

The operations include receiving at least one image 116 from the at least one camera 110. In some examples, the image(s) 116 could include a greyscale image or a color image of a scene. Additionally, in some examples, the at least one image 116 may be received in a series of image frames. Further, in some examples the at least one image 116 is received over a low latency data channel.

The operations further include adjusting the at least one image 116 to provide at least one adjusted image 118. In such scenarios, adjusting the at least one image 116 could include applying a plurality of image adjustments. For example, the image adjustments could include a local adaptive histogram equalization filter 156, a shot noise filter 158, and a sharpening filter 160.

More specifically, the local adaptive histogram equalization filter 156 includes the CLAHE process or method. To accommodate the computational limitations of the FPGA, the FPGA may be configured to execute method steps of the CLAHE process in serial to provide a pipelined process.

Namely, the CLAHE process involves partitioning the image 116 into a plurality of tile images. In some examples, partitioning the image 116 into the plurality of tile images includes partitioning the image 116 in a horizontal direction across a width of the image 116 and in a vertical direction across a length of the image 116 into the plurality of tile images.

In some examples, the FPGA 162 may store a subset of the plurality of raw pixels of the image 116 in parallel with partitioning the at least one image 116. The subset of raw pixels correlate to the tile images undergoing serially processing by the FPGA 162. In some examples, the raw pixels may be stored, for example, in a first in, first out (FIFO) queue to be retrieved later for downstream processing.

Next, the FPGA 162 may compute a histogram for each tile image. In some examples, the histogram bins correlate to a pixel intensity value within each tile image. Further, the FPGA 162 may redistribute histogram values exceeding a predetermined histogram value threshold to establish an equalized histogram for each tile image. The FPGA 162 may then calculate a cumulative distribution function (CDF) for the equalized histograms for each tile image. In some examples, to accommodate for the computational capabilities of the FPGA 162, the histogram computation, redistribution, and CDF calculation is done serially (i.e., one tile image at a time).

Further, the FPGA 162 may perform a bilinear interpolation for nearest neighbor tile of each tile image of the contrast limited histograms of the four nearest tiles (e.g., the two nearest tiles at the image edges and just the nearest tile at the image corners). In some examples, the bilinear interpretation involves determining a transformation function for each tile image. The transformation function is proportional to the CDF. More specifically, maximum slope of the CDF limits the contrast adjustment of the transformation function. For example, large values of maximum slope will maximize local contrast while smaller values will introduce lower changes in local contrast. A maximum slope value of 1 will provide the original image.

The FPGA 162 may then retrieve the stored raw pixels serially from the FIFO to calculate an adjusted pixel intensity value for each stored pixel based on a weighted average of transformation functions corresponding to the nearest neighbor tiles to establish an adjusted pixel. The weighted average is calculated based on the neighbor tile location with respect to the pixel location. For example, if a pixel is located near the left edge of a tile image, the left tile image transformation function is weighted greater than the right tile image transformation function when calculating the adjusted pixel intensity value.

To further accommodate the limited computational capacity and memory of the FPGA 162, after calculating the adjusted pixel intensity value, each raw pixel of the stored subset of pixels is serially deleted once the pixel adjustment is completed. The FPGA 162 may then align or stitch the adjusted pixels to form the adjusted image 118.

Additional image filters and processing techniques may be applied in combination with the techniques described herein. For example, a shot noise filter 158 can be applied before or after CLAHE to reduce noise in the imagery. Likewise, a sharpening filter 160 can be applied before or after CLAHE to make key image features more distinct. Further, a global gamma correction filter may be performed before or after CLAHE. Gamma correction globally stretches or compresses contrast across the full data dynamic range using a power law. Additionally, a local contrast filter may be performed before or after CLAHE.

Once the adjusted image 118 is developed, the FPGA 162 may transmit the adjusted image 118 to the display 130. Further, in some examples the FPGA 162 may process and transmit the series of image frames at a frame rate suitable for high-definition video.

Figure 2A:
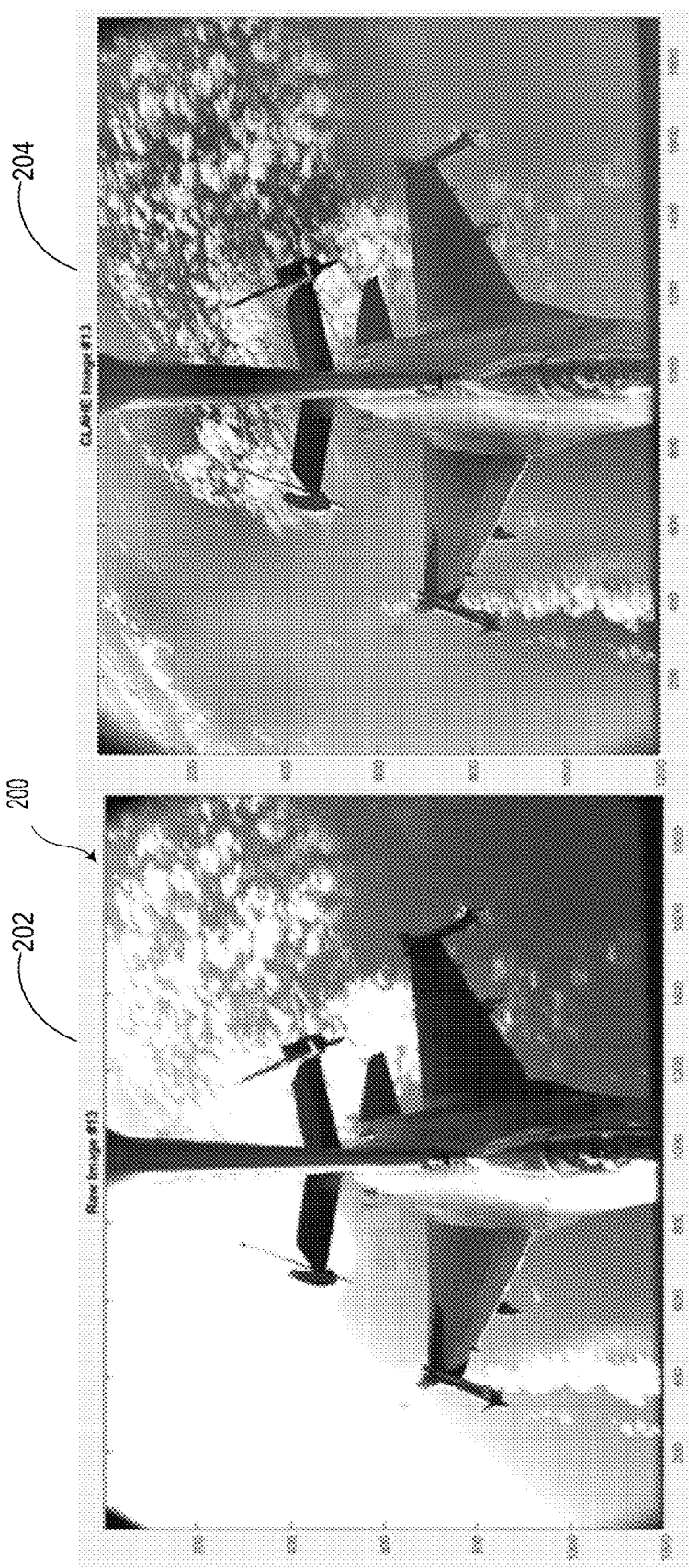
FIG. 2A illustrates an image and an adjusted image of a scene, according to an example implementation.

FIG. 2A illustrates an image 202 and an adjusted image 204 of a scene 200, according to an example implementation. The adjusted image 204 was provided based on the operations and methods described herein. As an example, the adjusted image 204 shows less glare, less noise, fewer blown highlights, and better exposure and contrast control, as compared to image 202.

Figure 2B:
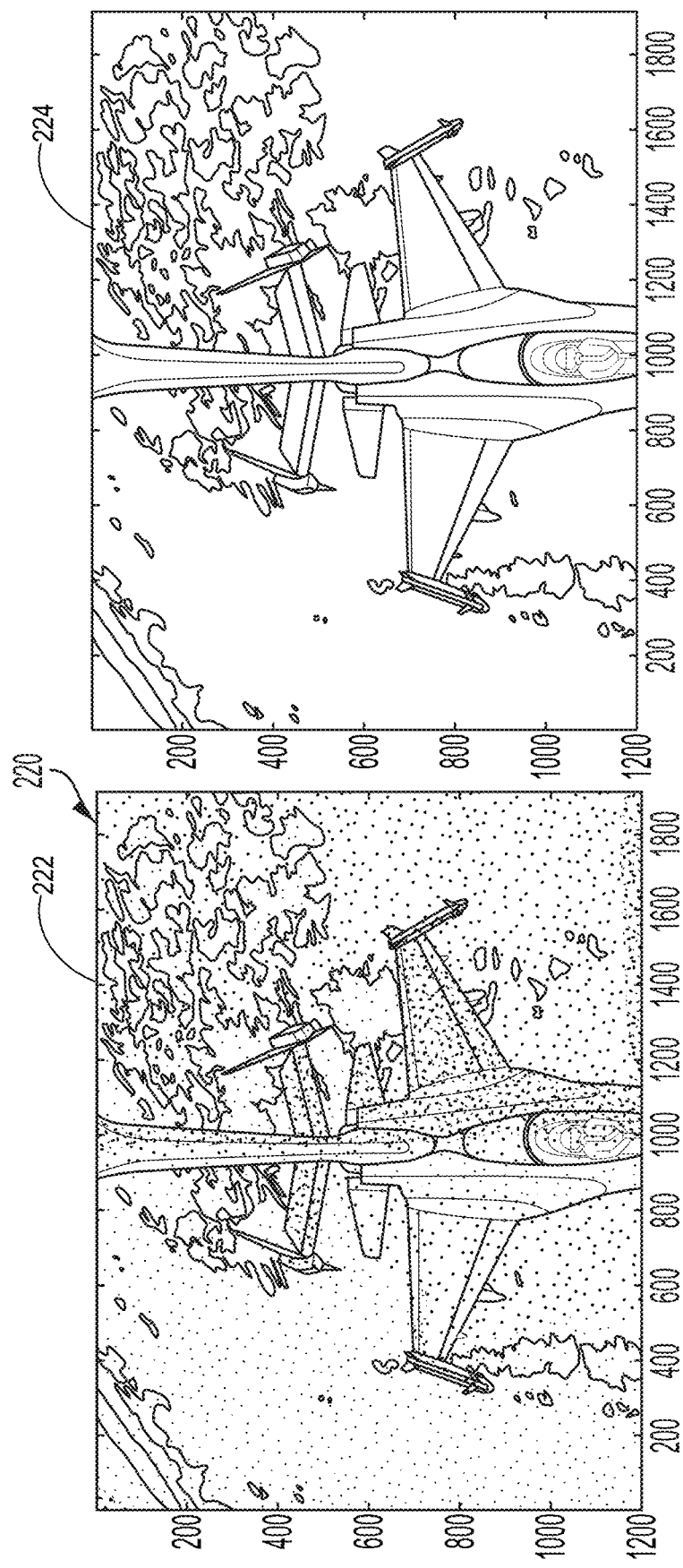
FIG. 2B illustrates an image and an adjusted image of a scene, according to an example implementation.

FIG. 2B illustrates line drawings of an image 222 and an adjusted image 224 of a scene 220, according to an example implementation. The adjusted image 224 could be provided based on carrying out the operations and/or methods described herein. As an example, the adjusted image 224 shows less noise and better object clarity, as compared to image 222.

Figure 2C:
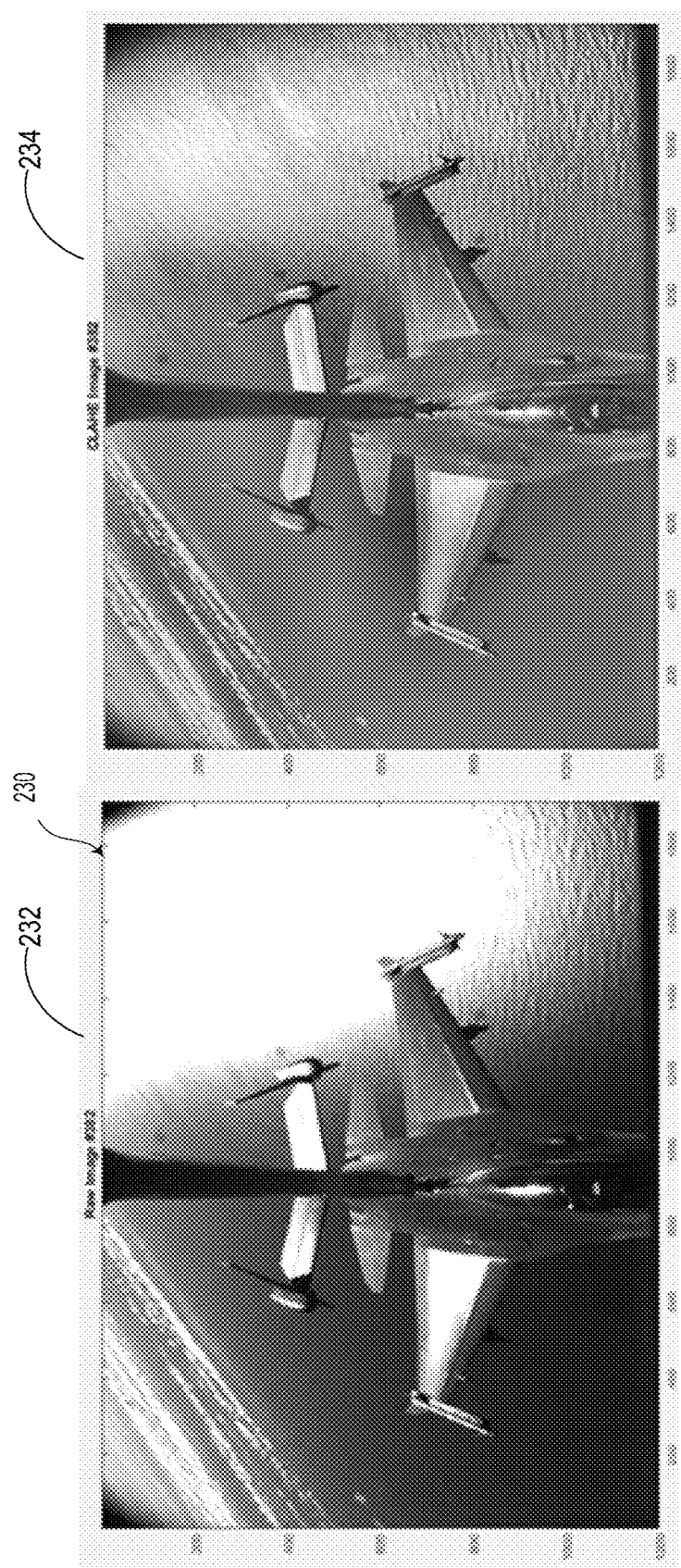
FIG. 2C illustrates an image and an adjusted image of a scene, according to an example implementation.

FIG. 2C illustrates an image 232 and an adjusted image 234 of a scene 230, according to an example implementation. The adjusted image 234 could be provided based on carrying out the operations and/or methods described herein. As an example, the adjusted image 234 shows less glare, less noise, fewer blown highlights, and better exposure and contrast control, as compared to image 232. As illustrated in FIG. 2C, the adjusted image 234 provides much better control of sunlight glare off of the wing surface of the second aircraft as well as off of the surface of the water in scene 230.

Figure 3:
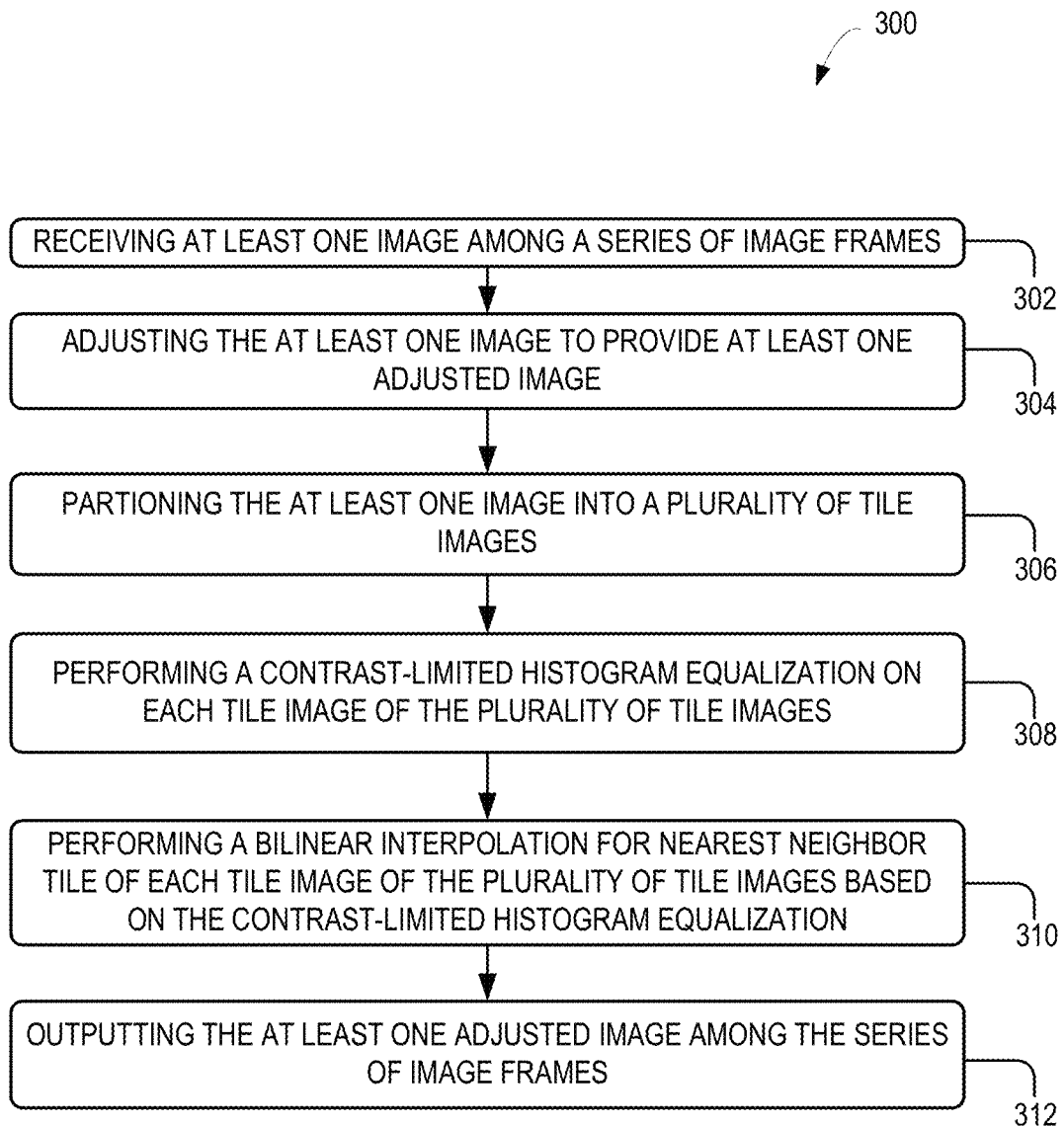
FIG. 3 illustrates a method, according to an example implementation.

Referring now to FIG. 3, a flowchart of an example of a method 300 of implementing a CLAHE algorithm, according to an example implementation. Method 300 shown in FIG. 3 presents an example of a method that could be used with an imaging processing system 100 shown in FIG. 1. Further, devices or systems may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 300 may include one or more operations, functions, or actions as illustrated by one or more of blocks 302-344. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 302, the method 300 includes receiving, at a field programmable gate array (FPGA), at least one image among a series of image frames. In some examples, the at least one image is received over a low latency data channel.

Figure 11:
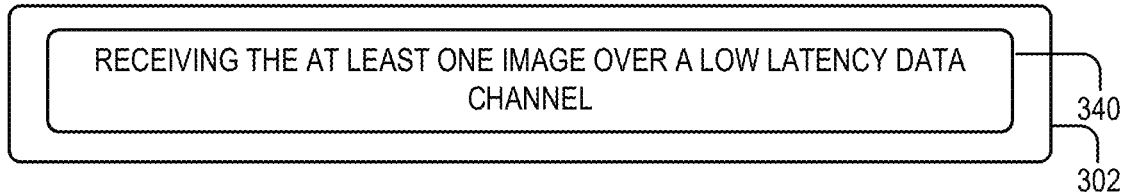
FIG. 11 illustrates a method according to an example implementation.

FIG. 11 shows a flowchart of an example method for receiving, at a FPGA, at least one image among a series of image frames, as shown in block 302, according to an example implementation. At block 340, method 300 may further include receiving the at least one image over a low latency data channel.

Returning to FIG. 3, at block 304, the method 300 includes adjusting, by the FPGA, the at least one image to provide at least one adjusted image.

Figure 4:
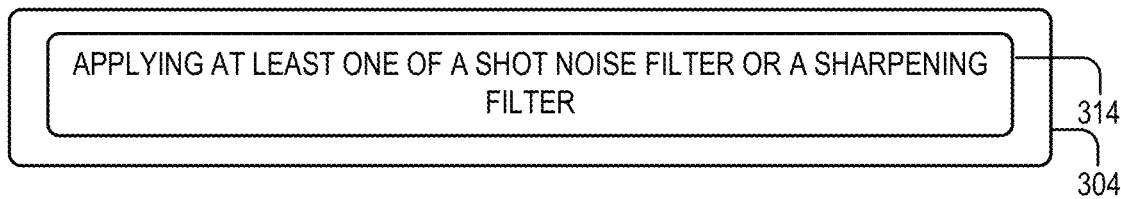
FIG. 4 illustrates a method, according to an example implementation.

FIG. 4 shows a flowchart of an example method for adjusting the at least one image to provide at least one adjusted image, as shown in block 304, according to an example implementation. At block 314, method 300 may further include applying at least one of a shot noise filter or a sharpening filter.

Figure 12:
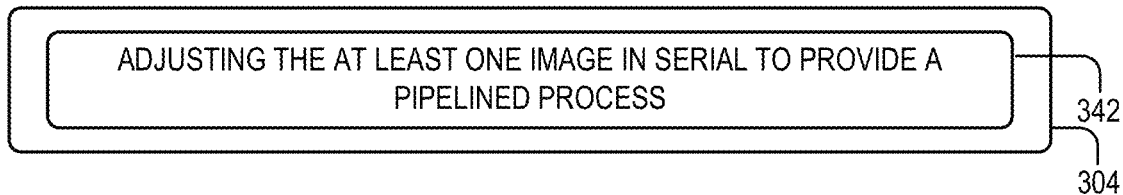
FIG. 12 illustrates a method according to an example implementation.

FIG. 12 shows a flowchart of an example method for adjusting the at least one image to provide at least one adjusted image, as shown in block 304, according to an example implementation. At block 342, method 300 may further include adjusting the at least one image in serial to provide a pipelined process.

Returning to FIG. 3, at block 306, method 300 includes partitioning, by the FPGA, the at least one image into a plurality of tile images.

Figure 5:
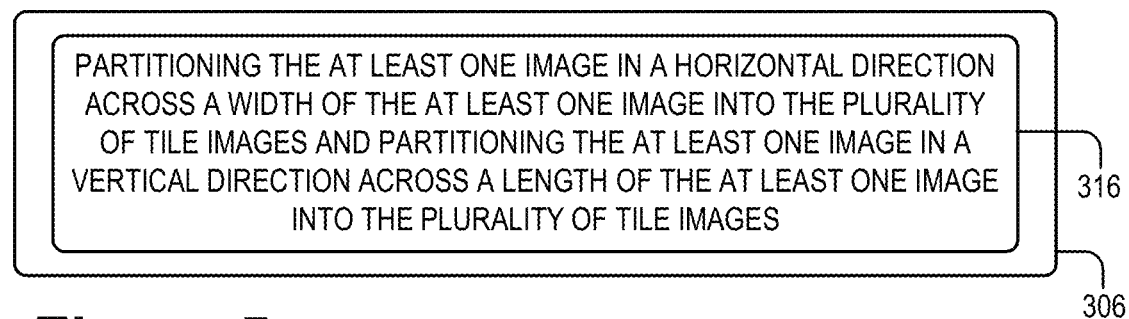
FIG. 5 illustrates a method, according to an example implementation.

FIG. 5 shows a flowchart of an example method for partitioning the at least one image into a plurality of tile images, as shown in block 306, according to an example implementation. At block 316, method 300 may further include partitioning the at least one image into the plurality of tile images comprises partitioning the at least one image in a horizontal direction across a width of the at least one image into the plurality of tile images and partitioning the at least one image in a vertical direction across a length of the at least one image into the plurality of tile images.

Returning to FIG. 3, at block 308, method 300 includes performing, by the FPGA, a contrast-limited histogram equalization on each tile image of the plurality of tile images.

Figure 6:
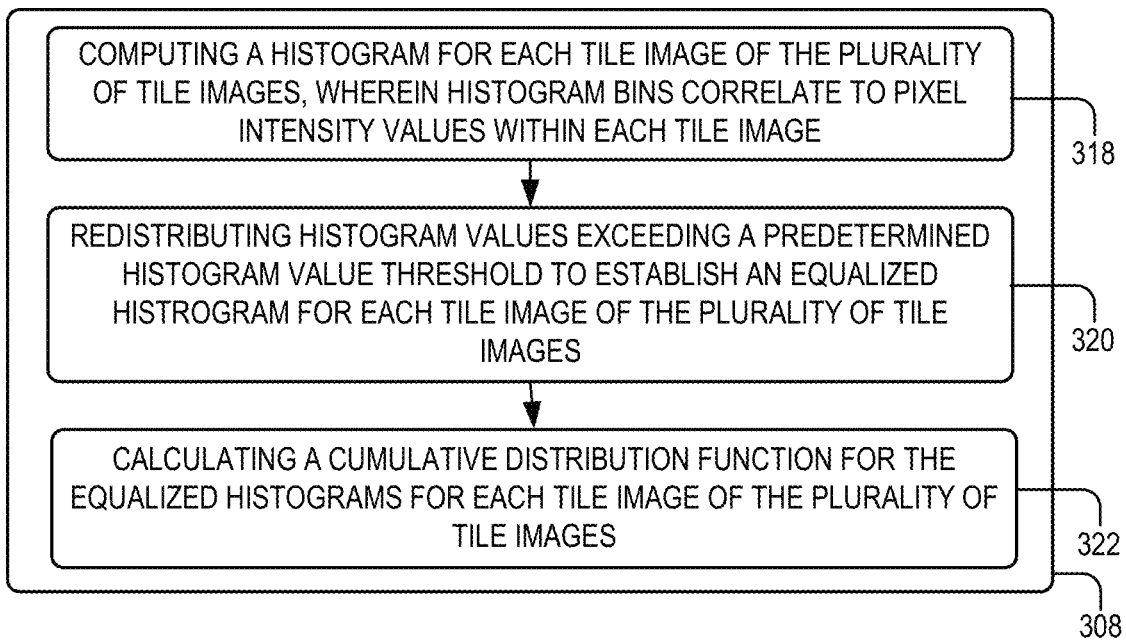
FIG. 6 illustrates a method, according to an example implementation.

FIG. 6 shows a flowchart of an example method for contrast-limited histogram equalization on each tile image of the plurality of tile images, as shown in block 308, according to an example. At block 318, method 300 may further include computing, by the FPGA, a histogram for each tile image of the plurality of tile images, wherein the at least one image comprises a plurality of pixels, wherein each pixel comprises a pixel intensity value, and wherein histogram bins correlate to pixel intensity values within each tile image. At block 320, method 300 may further include redistributing, by the FPGA, histogram values exceeding a predetermined histogram value threshold to establish an equalized histogram for each tile image of the plurality of tile images. At block 322, method 300 may further include calculating, by the FPGA, a cumulative distribution function for the equalized histograms for each tile image of the plurality of tile images.

Figure 13:
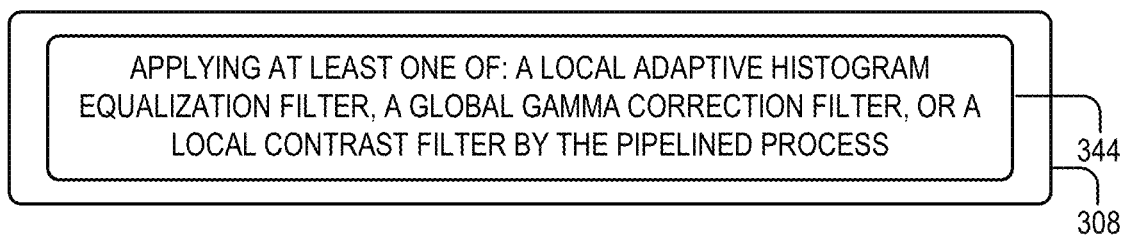
FIG. 13 illustrates a method according to an example implementation.

FIG. 13 shows a flowchart of an example method for contrast-limited histogram equalization on each tile image of the plurality of tile images, as shown in block 308, according to an example. At block 344, method 300 further includes applying at least one of: a local adaptive histogram equalization filter, a global gamma correction filter, or a local contrast filter by the pipelined process.

Returning to FIG. 3, at block 310, method 300 further includes performing, by the FPGA, a bilinear interpolation for nearest neighbor tile of each tile image of the plurality of tile images based on the contrast-limited histogram equalization.

Figure 7:
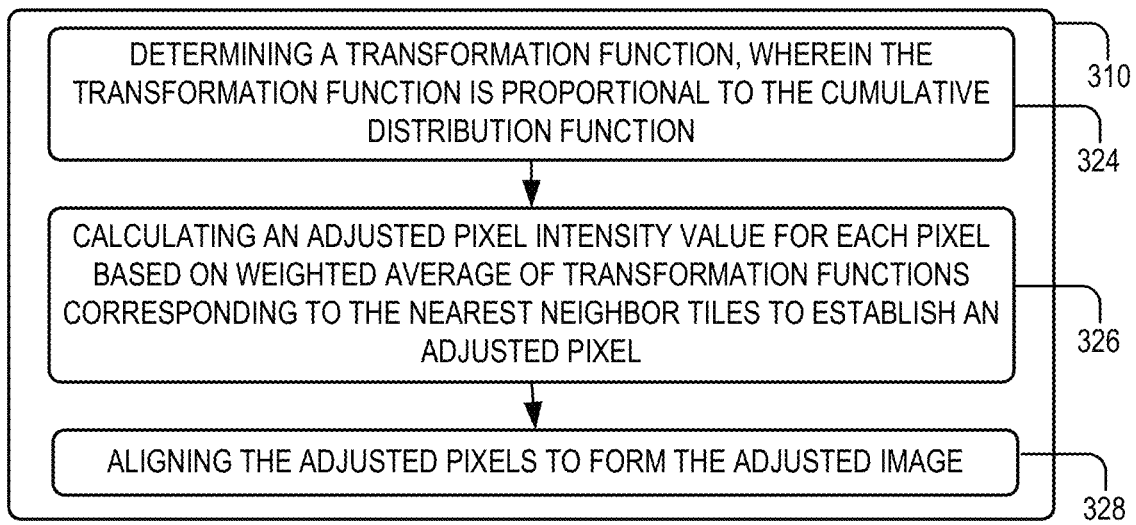
FIG. 7 illustrates a method, according to an example implementation.

FIG. 7 shows a flowchart of an example method for performing, by the FPGA, a bilinear interpolation for nearest neighbor tile of each tile image of the plurality of tile images based on the contrast-limited histogram equalization, as shown in block 310, according to an example implementation. At block 324, method 300 further includes determining, by the FPGA, a transformation function, wherein the transformation function is proportional to the cumulative distribution function. At block 326, method 300 further includes calculating, by the FPGA, an adjusted pixel intensity value for each pixel based on a weighted average of transformation functions corresponding to the nearest neighbor tiles to establish an adjusted pixel. At block 328, method 300 further includes aligning, by the FPGA, the adjusted pixels to form the adjusted image.

Returning to FIG. 3, at block 312, the method 300 includes outputting, by the FPGA, the at least one adjusted image among the series of image frames.

Figure 8:
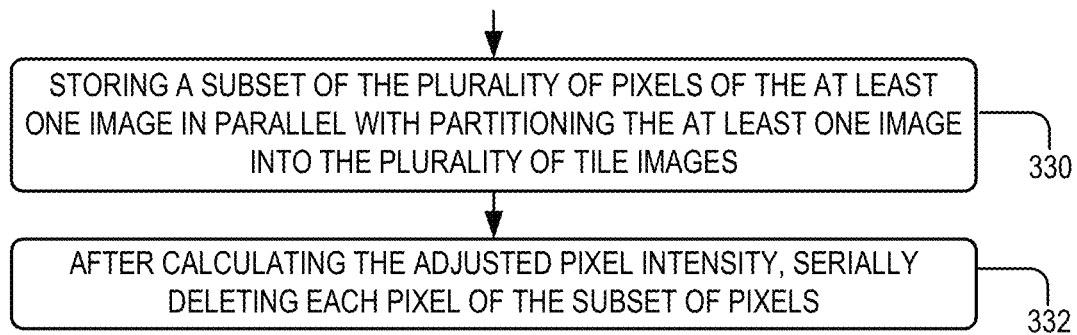
FIG. 8 illustrates a method according to an example implementation.

FIG. 8 shows an example method for use with the method 300. At block 330, the method 300 includes storing, by the FPGA, a subset of the plurality of pixels of the at least one image in parallel with partitioning the at least one image into the plurality of tile images. At block 332, the method 300 includes after calculating the adjusted pixel intensity value, serially deleting, from the FPGA, each pixel of the subset of pixels.

Figure 9:
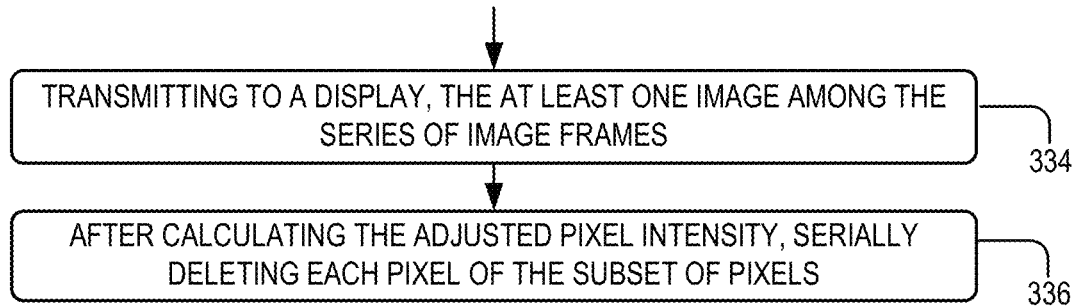
FIG. 9 illustrates a method according to an example implementation.

FIG. 9 shows an example method for use with the method 300. At block 334, the method includes transmitting, by the FPGA to a display, the at least one image among the series of image frames. At block 336, the method 300 further includes displaying, by the display, the series of image frames as high-definition video.

Figure 10:
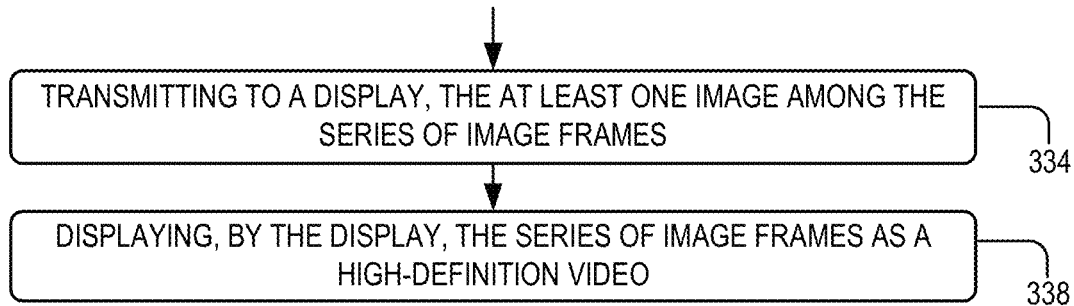
FIG. 10 illustrates a method according to an example implementation.

FIG. 10 shows an example method for use with the method 300. At block 334, the method includes transmitting, by the FPGA to a display, the at least one image among the series of image frames. At block 338, the method 300 further includes displaying, by the display, the series of image frames a high-definition video.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:
1. A method of processing images comprising:
receiving, at a field programmable gate array, at least one image among a series of image frames, wherein the at least one image comprises a plurality of pixels, wherein each pixel comprises a pixel intensity value;

adjusting, by the field programmable gate array, the at least one image to provide at least one adjusted image, wherein adjusting the at least one image, comprises:

partitioning, by the field programmable gate array, the at least one image into a plurality of tile images;

performing, by the field programmable gate array, a contrast-limited histogram equalization on each tile image of the plurality of tile images, wherein performing the contrast-limited histogram equalization comprises:

computing, by the field programmable gate array, a histogram for each tile image of the plurality of tile images, wherein histogram bins correlate to pixel intensity values within each tile image; and redistributing, by the field programmable gate array, histogram values exceeding a predetermined histogram value threshold to establish an equalized histogram for each tile image of the plurality of tile images; and performing, by the field programmable gate array, a bilinear interpolation for nearest neighbor tile of each tile image of the plurality of tile images based on the contrast-limited histogram equalization; and outputting, by the field programmable gate array, the at least one adjusted image among the series of image frames.

2. The method of claim 1, wherein the field programmable gate array is configured to execute method steps of adjusting the at least one image in serial to provide a pipelined process.

3. The method of claim 2, wherein performing, by the field programmable gate array, the contrast-limited histogram equalization on each tile image comprises applying at least one of: a local adaptive histogram equalization filter, a global gamma correction filter, or a local contrast filter by the pipelined process.

4. The method of claim 1, wherein adjusting the at least one image further comprises applying at least one of:
a shot noise filter; or
a sharpening filter.

5. The method of claim 1, wherein performing, by the field programmable gate array, the contrast-limited histogram equalization on each tile image of the plurality of tile images further comprises:

calculating, by the field programmable gate array, a cumulative distribution function for the equalized histograms for each tile image of the plurality of tile images.

6. The method of claim 5, wherein performing, by the field programmable gate array, the bilinear interpolation for nearest neighbor tile of each tile image of the plurality of tile images further comprises:

determining, by the field programmable gate array, a transformation function, wherein the transformation function is proportional to the cumulative distribution function;

calculating, by the field programmable gate array, an adjusted pixel intensity value for each pixel based on a weighted average of transformation functions corresponding to the nearest neighbor tiles to establish an adjusted pixel; and aligning, by the field programmable gate array, the adjusted pixels to form the adjusted image.

7. The method of claim 6 further comprising:
storing, by the field programmable gate array, a subset of the plurality of pixels of the at least one image in parallel with partitioning the at least one image into the plurality of tile images; and after calculating the adjusted pixel intensity value, serially deleting, from the field programmable gate array, each pixel of the subset of pixels.

8. The method of claim 1, wherein the series of image frames are output at a frame rate suitable for high-definition video, and wherein the method further comprises:

transmitting, by the field programmable gate array to a display, the at least one adjusted image among the series of image frames; and displaying, by the display, the series of image frames as high-definition video.

9. The method of claim 1, wherein receiving the at least one image among the series of image frames comprises receiving the at least one image over a low latency data channel.

10. The method of claim 1, wherein partitioning the at least one image into the plurality of tile images comprises partitioning the at least one image in a horizontal direction across a width of the at least one image into the plurality of tile images and partitioning the at least one image in a vertical direction across a length of the at least one image into the plurality of tile images.

11. A computing system comprising:
a display; and
a field programmable gate array configured to transmit image data to the display, wherein the field programmable gate array carries out operations, wherein the operations comprise:

receiving at least one image among a series of image frames, wherein the at least one image comprises a plurality of pixels, wherein each pixel comprises a pixel intensity value;

adjusting the at least one image to provide at least one adjusted image, wherein adjusting the at least one image, comprises:

partitioning the at least one image into a plurality of tile images;

performing a contrast-limited histogram equalization on each tile image of the plurality of tile images, wherein performing the contrast-limited histogram equalization comprises:

computing a histogram for each tile image of the plurality of tile images, wherein histogram bins correlate to pixel intensity values within each tile image; and redistributing histogram values exceeding a predetermined histogram value threshold to establish an equalized histogram for each tile image of the plurality of tile images;

performing a bilinear interpolation for nearest neighbor tile of each tile image of the plurality of tile images based on the contrast-limited histogram equalization and pixel intensity values within each tile image; and outputting the at least one adjusted image among the series of image frames.

12. The computing system of claim 11, wherein the field programmable gate array is configured to execute operational steps of adjusting the at least one image in serial to provide a pipelined process.

13. The computing system of claim 12, wherein performing the contrast-limited histogram equalization on each tile image comprises applying at least one of: a local adaptive histogram equalization filter, a global gamma correction filter, or a local contrast filter by the pipelined process.

14. The computing system of claim 11, wherein adjusting the at least one image further comprises applying at least one of:
a shot noise filter; or
a sharpening filter.

15. The computing system of claim 11, and wherein performing, by the field programmable gate array, the contrast-limited histogram equalization on each tile image of the plurality of tile images further comprises:
calculating a cumulative distribution function for the equalized histograms for each tile image of the plurality of tile images.

16. The computing system of claim 15, wherein performing the bilinear interpolation for nearest neighbor tiles of each tile image of the plurality of tile images further comprises:
determining a transformation function, wherein the transformation function is proportional to the cumulative distribution function;
calculating an adjusted pixel intensity value for each pixel based on a weighted average of transformation functions corresponding to the nearest neighbor tiles to establish an adjusted pixel; and
aligning the adjusted pixels to form the adjusted image.

17. The computing system of claim 16, wherein the operations further comprise:
storing a subset of the plurality of pixels of the at least one image in parallel with partitioning the at least one image into the plurality of tile images; and
after calculating the adjusted pixel intensity value, serially deleting each pixel of the subset of pixels.

18. The computing system of claim 11, wherein receiving the at least one image among the series of image frames comprises receiving the at least one image over a low latency data channel.

19. The computing system of claim 11, wherein partitioning the at least one image into the plurality of tile images comprises partitioning the at least one image in a horizontal direction across a width of the at least one image into the plurality of tile images and partitioning the at least one image in a vertical direction across a length of the at least one image into the plurality of tile images.

20. A non-transitory computer-readable media storing instructions executable by one or more processors, wherein the instructions, when executed, cause the one or more processors to perform functions comprising:
receiving, at a field programmable gate array, at least one image among a series of image frames, wherein the at least one image comprises a plurality of pixels, wherein each pixel comprises a pixel intensity value;
adjusting, by the field programmable gate array, the at least one image to provide at least one adjusted image, wherein adjusting the at least one image, comprises:
partitioning, by the field programmable gate array, the at least one image into a plurality of tile images;
performing, by the field programmable gate array, a contrast-limited histogram equalization on each tile image of the plurality of tile images, wherein performing the contrast-limited histogram equalization comprises:
computing a histogram for each tile image of the plurality of tile images, wherein histogram bins correlate to pixel intensity values within each tile image; and
redistributing histogram values exceeding a predetermined histogram value threshold to establish an equalized histogram for each tile image of the plurality of tile images;
performing, by the field programmable gate array, a bilinear interpolation for nearest neighbor tile of each tile image of the plurality of tile images based on the contrast-limited histogram equalization; and
outputting, by the field programmable gate array, the at least one adjusted image among the series of image frames.

* * * * *